UNITED STATES PATENT OFFICE.

CHARLES M. BOWMAN, OF LEBANON, PENNSYLVANIA, ASSIGNOR TO THE DIAMOND MATCH COMPANY, OF NEW YORK, N. Y., A CORPORATION OF ILLINOIS.

MATCH.

SPECIFICATION forming part of Letters Patent No. 707,080, dated August 19, 1902.

Application filed February 3, 1900. Serial No. 3,819. (No model.)

*To all whom it may concern:*

Be it known that I, CHARLES M. BOWMAN, of Lebanon, in the county of Lebanon, and in the State of Pennsylvania, have invented certain new and useful Improvements in Matches; and I do hereby declare that the following is a full, clear, and exact description thereof.

The object of my invention has been to make matches absolutely safe from danger of being ignited by being gnawed or nibbled by rats or mice; and with this end in view my invention consists in the match made as hereinafter specified.

As is well known, rats and mice will gnaw or nibble at friction-matches when they can gain access thereto, and have set fire to the match-heads by so doing. It is believed that they thus gnaw or nibble the matches because of the paraffin with which the match-splints are treated and of which they are quite fond. As the splint is usually paraffined only at and close to the head end of the match, the rats or mice attempting to get all of the paraffin are apt to bite or nibble the lower edge of the head, and so fire the match thereby, sometimes causing destructive fires. To prevent this dangerous gnawing or nibbling of matches, I mix with the paraffin before the latter is applied to the match-splints in making matches a substance which will be repulsive to the rats, and therefore deter them from attempting to eat it. While to secure the desired object I prefer to mix with the paraffin a substance which will be repulsive both in taste and smell to the rats or mice, I contemplate using instead one that will be substantially without smell, but repulsive because of its taste. This I consider to be within the scope of my invention, the essential feature of which is the rendering of the paraffin repulsive to the rats or mice, so that they will have no temptation or desire to gnaw or nibble at the paraffined matches. Where the substance which is repulsive because of smell as well as taste is employed, the smell will also keep the rats and mice away from the match-heads also, so that they will not approach the same to nibble them, whatever may be in such heads.

For the purpose of rendering the matches repulsive to rats and mice because of the smell as well as the taste I use to mix with the paraffin a small portion of oil of horsemint. This I dissolve in an equal amount of alcohol and then incorporate the resultant solution intimately with the paraffin while the latter is in a melted or softened state. The amount of the solution used is about one-quarter of an ounce to a pound of paraffin, though I do not limit myself to such proportions. The paraffin thus treated can be used to paraffin the match-sticks in the ordinary and well-known way before the heads are applied to such sticks or can be applied over both heads and portions of the splints after the heads have been formed.

For making the paraffin repulsive to rats or mice because of the taste alone I prefer to employ tannin or tannic acid as the substance to be mixed or incorporated with the paraffin. To render the mixing or incorporation of the tannin easy, I use a solution of it in alcohol and mix such solution intimately with the paraffin while the latter is in a softened or melted state. The amount of tannin which I use to the pound of paraffin is about three ounces to a pound, though I do not limit myself to such proportions. As in the case of the oil of horsemint, the paraffin can be thus treated just before being used for dipping the match-splints, or it can be treated in large masses and then allowed to cool and kept for any length of time to be used, as desired, for any dipping operation. The paraffin with the incorporated tannin can be used on the match-sticks in the ordinary way—that is, before the heads are applied to the sticks or after the heads are formed, in which case it can be applied either to the splints close to the heads or made to cover both the heads and parts of the splints.

Where the tannin-treated paraffin is used, the rats or mice are not only not attracted by the paraffin as an article of food, but are by the taste of the compound kept from gnawing any part of the match to which such compound is applied. Where the oil of horsemint is incorporated with the paraffin, the odor keeps the rats and mice entirely away from the matches, while the taste of the oil in the paraffin renders the latter not only not attractive as a food, but repulsive, so that the rats and mice could not gnaw or nibble it or anything coated or treated with it.

It will be seen from the above that my invention has enabled me to render easily and most cheaply friction-matches absolutely safe from any injury or from ignition by the gnawing or nibbling of rats or mice.

While I have described my invention as employed where paraffin is used to treat the match splints or sticks, I desire it to be understood that the oil of horsemint can be employed with other substances used instead of paraffin in the making of matches.

Having thus described my invention, what I claim is—

1. A match treated with oil of mint, substantially as and for the purpose described.

2. A match treated with paraffin containing oil of horsemint, substantially as and for the purpose described.

3. A match having a portion carrying oil of horsemint, as a repellent of rats or mice, substantially as described.

In testimony that I claim the foregoing I have hereunto set my hand this 24th day of January, 1900.

CHARLES M. BOWMAN.

Witnesses:
    J. F. ELLENBERGER,
    J. H. SCHOTT.